United States Patent [19]

Fisch et al.

[11] Patent Number: 5,548,317
[45] Date of Patent: Aug. 20, 1996

[54] CEL PRODUCTION BY THERMAL TRANSFER PROCESSES

[75] Inventors: Richard S. Fisch, St. Paul; David A. Larshus, Maplewood, both of Minn.

[73] Assignee: Minnesota Mining and Manufacturing, St. Paul, Minn.

[21] Appl. No.: 65,746

[22] Filed: May 7, 1993

[51] Int. Cl.$^6$ ................................................. B41J 2/325
[52] U.S. Cl. ........................... 347/171; 347/172; 347/176
[58] Field of Search .................. 346/76 PH; 400/120.04, 400/120.02; 347/176, 172, 171

[56] References Cited

U.S. PATENT DOCUMENTS

| | | | |
|---|---|---|---|
| 4,472,479 | 9/1984 | Hayes et al. | 428/324 |
| 4,569,577 | 2/1986 | Spencer | 352/87 |
| 4,627,997 | 12/1986 | Ide | 428/216 |
| 4,704,615 | 11/1987 | Tanaka | 346/76 PH |
| 4,923,846 | 5/1990 | Kutsukake et al. | 503/227 |
| 4,990,486 | 2/1991 | Kamosaki et al. | 503/227 |

FOREIGN PATENT DOCUMENTS

| | | |
|---|---|---|
| 0529929A1 | 8/1982 | European Pat. Off. . |
| 0452566A1 | 4/1990 | European Pat. Off. . |
| 4014866A1 | 11/1990 | Germany . |
| 8601291 | 5/1986 | Netherlands . |
| 92-3805 | 5/1992 | Rep. of Korea . |
| WO91/14581 | 10/1991 | WIPO . |

*Primary Examiner*—Huan H. Tran
*Attorney, Agent, or Firm*—Gary L. Griswold; Walter N. Kirn; Mark A. Litman

[57] ABSTRACT

A process for the formation of a cel for use in color animation motion picture production comprises the steps of providing electronic information of a color image to a thermal printer, thermally printing a first image having at least some opaque areas therein onto a transparent carrier sheet from said electronic information, and optically combining said first image with a second image on a separate transparent sheet, the composite of the first and second image forming a cel.

17 Claims, No Drawings

CEL PRODUCTION BY THERMAL TRANSFER PROCESSES

BACKGROUND OF THE INVENTION

1. Field of the Invention

The present invention relates to animated film production, cel creation for use in the production of animated film, and thermal transfer imaging systems, techniques, and media useful in the production of animated films.

2. Background of the Art

The visual quality of an animated film is readily observable as a function of the quality and detail of the individual motion picture frames. The individual frames in the film are photographic images taken of individual pictures for each individual frame. These individual pictures are called "cels". In the highest quality cels, the background area is drawn, usually by hand, and hand painted overlays of the active characters are placed over the background areas and the composite scene photographed. The active character figures are progressively different (and individually painted that way) for each cel. This is an exceedingly expensive procedure when the highest quality images are desired.

In lower quality animated films, such as those often produced expressly for low budget television shows, expenses are reduced by reducing the degree of activity of the characters. With lower levels of activity, the background area can encompass greater proportions of the active character, with less of the character having to be drawn to show its movement. For example, the background could include the normal scenic background and all of the character except for its mouth. The only overlay for the cel would have to be the moving lower jaw of the character to show that it was speaking.

Modern animated films can now use computer driven imaging systems to create the cels. The cels may be hand drawn and scanned, drawn on a digital screen and converted to digital information for the computer, and data may be created, enhanced, or altered by computer programs. Various programs are available where the computer can create the data of intermediate images between two scenes by a process call 'morphization,' where given a beginning position and an end position for a figure, the computer will generate the intermediate frames without the need for hand drawing. Any system which is capable of being data driven by a computer may be used as the image output system to produce the various cels, but color negative photographic imaging provides the highest quality images for the motion picture industry. This is still an expensive procedure and does not provide a wide range of flexibility in the manufacture of the cels.

There are also specific properties in the image of the cel which limit the types of imaging systems which could be useful in the manufacture of cels. For example, specific image areas in the overlays must be opaque so that the background does not show through the overlay. The traditional process for making animation cels is shown in U.S. Pat. No. 2,351,634 (W. Disney) and British Patents 595,255 (W. Disney) and 531,094 (R. Place). Opaque, hand-applied paints are used for each feature in the overlay of the cels.

Once the image and background cels are overlaid, they are photographed onto color negative photographic film. One frame of photographic film is exposed for each final frame image needed in the final film, which may be as many as hundreds of thousands of frames for a full length animated movie.

One other method which has been used to reduce the labor intensive steps in the animated film making process includes electronic printing. In that manner image assembly is combined with integral opaquing (that is opaquing steps that are an integral part of electronic imaging).

Each color which is used in the formation of the cels adds additional expense. The number of colors used in the animation is such a large factor in the cost of a production, that it is a part of the animated film making process to assign one individual, the Color Model Advisor, to analyze the animators' drawings for excessive detail, particularly with respect to excessive numbers of colors. As an example of this process, it is said that Jiminy Cricket had as many as twenty-seven colors in the Walt Disney animated film version of Pinocchio. When that same character was used on the Walt Disney Mickey Mouse Club films, the number of colors used was only nine. This was a very significant cost savings. Even the simplest characters will have at least about nine colors, so the cost of the production is greater with significant artistic enhancement of the character image, which would require many more colors.

Additional expenses are incurred in putting any color background or character on the screen. To begin with, each color utilized in an image represents an expense in itself. Each artist must have access to custom made bottles of ink with at least twice that quantity of colors estimated to be necessary for the full production requirements to insure production color quality control. The actual steps involved in cel production include paint mixing (and color control of the mixed paint), packaging and dispensing (to the various individual painters), precision "cel" area painting and drying times. All these times are additive for each color. Bottled color ink inventory control and remixture, when use exceeds inventory, causes color changes that waste time. Time can be reduced somewhat by means of computer directed dry color imaging and opaquing.

Eventually, the individual color or composite "cels" have to be photographed onto a color photographic media which has the capability of producing over 1.6 billion colors. The limited color gamut imposed by hand color ink mixing and "cel" inking restrict the final quality of the production. The special effects art and design techniques are even more labor intensive. The advent of the computer tended to eliminate some of the mechanical drudgery, but cel production still used labor intensive means.

Yet another labor intensive, but traditional animation operation, is "a self ink line". To keep the color within the image outline, each separate color must have an outline around it defining its border to the area next to it. In a particular figure, the hat is one color, the hair another, etc. When these outlines are done using black ink, there is a heavy, crude look that is fine for some characters, but unacceptable for more delicate ones. Colored inks were tried and were an improvement, but when a look of quality and careful shading was needed, they were still too strong. Presently, lines are inked on the back of the cel. The paint used is diluted to soften it. The combination of the diffusion effect and the diluted ink allows better colored image outline scarcely noticed on the screen. This technique provides soft color changes, delicate shades, and subdued values.

Additionally, the fully painted "cel" itself can represent a problem, the solution of which complicates production time and expense. Looking at a composite "cel" of Snow White, Disney's artists felt that the black hair looked unnatural and harsh, They added a wisp of drybrush in a lighter grey to soften the edge of her hair. It helped immensely, so they proceeded to add it to every cel all through the picture. This had to be done on top of the cels, and the only way to be sure the effect was working from one to the next was by flipping the whole sheet of celluloid, heavy with paint. The task was effective but it was tiring and risked cracking the paint. This risk is still taken on important productions.

The means of production and subsequent reproduction of each cel in a single frame of, and in a complete motion picture has been detailed in U.S. Pat. No. 2,281,033 by Garity assigned to W. Disney as well as *Disney Animation, the Illusion Of Life* by F. Thomas and O. Johnston, Abbeville Press, NY 1981 pages 47–71, "The Principles of Animation"; and "How to Get it on Screen" pages 243–285. Such techniques are as efficient with respect to today's technologies as is the use of room filled mainframe computers is to desk top imaging systems.

BRIEF DESCRIPTION OF THE INVENTION

It has been found in the practice of the present invention that thermal transfer imaging systems (both thermal mass transfer and thermal dye transfer) can be used to provide individual cels for use in the production of animation films or proofs for graphic arts, printing, or animation. The thermal transfer process can provide both backgrounds and overlays which are opaque. The process can provide a variety of colors as the thermal transfer donors can be provided in mass with a large variety of colors available.

DETAILED DESCRIPTION OF THE INVENTION

The present invention describes the use of thermal transfer processes and materials to produce cels for animated motion picture production and a means for previewing these "electronic" cel images before production printing. Thermal transfer process are used to form opaque images or image areas (i.e., a transmission optical density of less than 0.2, preferably less than 0.1, more preferable less than 0.05 and most preferably less than 0.02) on transparent substrates so the background areas for cels or the cel overlays can be prepared for animated motion pictures. The process deposits an opaque image or image area over at least a part of the transparent receptor surface (either directly or with intermediate transfer steps) and additional image information (either opaque, translucent, or transparent) is also deposited on the substrate, over the first opaque areas or adjacent the opaque areas. The opaque areas are needed so that portions of images may be overlaid (e.g., over the background areas) without the underlying image showing through. It has been found in the practice of the present invention that the underlying opaque areas (which may or may not be identical in shape to the overlying image) may be made of any color or tone of material. For example, although white is the preferred color or tone for an opaque deposition, bone, ivory, black, red, blue, cyan, magenta, green, or yellow, as well a metallic deposits (silver, gold, flat gray, bronze, shiny silver or gray, flat bronze, etc.) may also be used as the opaque area. When dyes are used as the overlays, the tone of the opaque areas may be more apparent as compared to overlays of mass transfer materials which are themselves opaque.

The office size provers or proofers assisted by table top computers of the design detailed in U.S. patent application Ser. No. 07/752,770 when applied to animation help insure a reduction in the time and manpower needed for the production of animated motion pictures. The use of such means provides the elimination of the separate ink bottles and the necessary constraints on the colors employed. In the case of the initial areas of subject or story concept, art and design, a proofer based using a dry imaging material such as dye sublimation imaging allows a full or partial preview hard copy image of an existing electronic file instead of black and white copy. Such hard copy color proofs made separately (each with its own small image progressive change) can be assembled in order, grasped by the user, and flipped to give the impression of movement much like that provided by the original hand kinescope and described in the aforementioned book, *Disney Animation, The Illusion of Life,* on pages 31–32.

Although such devices can output highly saturated color images which can be made to sublimate a set of industry standard colors by the techniques disclosed, the conventional, transparent colors offered by such thermal systems do not meet all the needs of the creative capabilities of the artist, art director or client since they are not opaque enough to allow differentiation between the animated subject and the background, nor provide means to selectively opaque a portion of an image area and allow another portion to remain clear.

For example, in the case of an animated character on a background, it is imperative that much of the character's form be visible against a background that might move (to give the illusion of the character itself moving). In such a case, a character or portion of a character may be produced using the dye sublimation process and the thermal mass transfer materials described in U.S. Pat. No. 5,372,987 or by using the techniques disclosed in U.S. patent application Ser. No. 07/932,087 and U.S. Ser. No. 07/862,346, now abandoned. When only portions of the animated character are opaque and the background fully opaque, the materials and processes of U.S. Pat. No. 5,372,987 allow that technique to be inexpensively achieved by means of special receptor sheets. Dye sublimation ribbons that contain 3 or 4 transparent color dye panels, with additional panels of a heat transferable white reflecting layer and means for the assembly into ribbons has been disclosed by the authors in that application as well as in U.S. Pat. No. 5,409,883, filed the same day as this application in the names of Fisch, Larshus, Chou and Vono. That Application is incorporated by reference for its teaching of the means for manufacturing thermal transfer ribbons and sheets.

Such opaque images serve as a portion of an overlay image assembly useful for animation "cels" and graphic arts design applications requiring overlays of single or multiple color images on top of a background images. At least one such image overlay portion is distinguished by its need to hide the image or color below it.

Additionally, such animation "cels" can be made using a single sheet composite "cel" wherein a transparent support is first imaged using a background image and then overprinted with an opaque layer corresponding to the outline of a second image to be overlayed on a portion of the first image. Over this composite a transparent color image corresponding in size and in register with the opaque image is applied. Third or additional images can be overlayed by first allowing an opaque image to be produced in a desired position and then dictating the in-register additional transparent color image over this last opaque image. In such a manner, several images can be superimposed on each other, allowing a single sheet composite equal to several separate overlay "cels". The advantages in this technique over multiple layer "cels" include reduction in light scattering between each of the different "cel" surfaces during exposure onto motion picture intermediate or release stock, reduction in the handling of the fragile overlay image areas, and the ability to incorporate more character-independent images without adding "cels" to an already thick package of individual "cel" sheets.

The proofer or printer of this invention shall be capable of producing from 1 to over 5 different overlay images. At least one of these overlay images requires visible separation from the other images. The proofer described in U.S. patent application Ser. No. 07/752,770 authored by Fisch, Larshus and Jongewaard is preferred in the practice of the present invention, although an alternate thermal printer may be employed.

The imaging materials (now called donor sheets or materials) should be available in sheet or roll form, preferably in roll stock. Additionally, when in roll stock as panels of color, each of said panels shall consist of at least 3 colors and as many as 10 colors. Each panel shall consist of a sequence of colors as needed arranged in any order useful in the animation system. Each panel shall contain at least one opaque segment, in addition to traditionally transparent color segments, including black. An optional black opaque color is also desirable. (For a review of prior art on opaque colors see U.S. Pat. No. 5,372,987 and the above-identified U.S. patent application filed concurrently with this application, concerning the thermal proofing of graphic arts opaque images.) When an opaque black or two black panels are provided in a donor roll an optional sequence for the panel, colors may be at least black (preferably opaque), yellow, magenta, and cyan in any order, followed by a transparent black, then an opaque white layer.

Typical thermal transfer compositions which may be used as coating compositions (in solvent, pure and binderless, or liquid dispersion states) in the practice of the present invention include all those described in the art and literature of thermal transfer imaging. As the segments may be transferred by thermal transfer, the availability of these varied materials can be readily understood. As the coatings can be applied to distinctly different substrates, the availability of final sheets and ribbons with highly diverse coloring segments can be readily attained.

For example, one final thermal donor sheet can contain patches of vapor deposited metal pigments, fluorescent pigment, opaque thermal mass transfer colorant, and translucent thermal dye transfer materials. By cutting and splicing these materials together from primary thermal transfer sources, an infinite variety of multi-color donor sheets can be provided, each sheet being tailored by the selection of individual colors for the production of a particular image or series of images. Both traditional (e.g., red, yellow, blue, green, cyan, magenta, and black) colors may be used or non-traditional colors (fluorescent colors, white, gray, brown, metallics, opaque hwite, shiny metallics, and the like) may be used. Of particular benefit is an opaque, particularly opaque white thermal mass transferable composition. This can help form opaque color images with non-opaque overcoatings of other colors, both with mass transfer and surprisingly with dye transfer on top of the opaque (particularly opaque white) transferred image. By opaque it is meant that the deposited image has an optical density of at least 1.0 or at least 2.0 (to reflected light) and more preferably at least 2.5, and most preferably at least 3.0. Dye transfer patches may also be used in the practice of the present invention by thermally transferring a dye onto an opaque area generated by the thermal mass transfer of an opaque composition.

The sequential color panels may be coated by various means, including gravure, to enable each panel to have a diverse color. The color sequence for such stock may be coated in order or assembled by any of various techniques. The matching of "cel" thermal image colors to the spectral sensitivity of the intermediate motion picture stock used in the motion pictures or to the colors formed by exposure and chromogenic development of the final printing stock is accomplished through the use of techniques disclosed in U.S. patent application Ser. Nos. 07/784,469, 07/932,087 and 07/862,346, now abandoned. Minimization of the interlayer reflections due to the illumination process for "cel" and background simultaneous imaging is reduced by the use of antireflective coatings such as sol gel coatings, which form continuous gelled networks of inorganic oxide (and metal oxide) colloidal particles.

EXAMPLE 1

Opaque panels of white heat transferable material were inserted into a roll of four color dye sublimation donor ribbon in position after the black panels of a YMCK sequence using the techniques of said copending U.S. Pat. No. 3,409,883. The color ribbon roll is available commercially under as 3M Rainbow Proofing Ribbon #PE-433.

CONSTRUCTION OF THE WHITE OPAQUE PANEL

The panel consists of a single coating of white opaque material of 2–3 micron thickness on a polyethylene terephthalate 6 micron thick support.

The coating mixture consists of:

5 parts Titanium Dioxide DuPont R902 (average particle size 100 nm)

3 parts of Al(OH)3 Alcoa Space Rite S-11 Aluminia Alcoa Bauxite AR 2 parts of XG-11 Carboset Polymer (Goodrich, Cleveland, Ohio) dispersed in Isopropanol.

Transmission Optical density of said panel is about 3.0 using the visual response of a Macbeth TR527 densitometer. Since the TR527 measures both transmitted and scattered light it is not a good indicator of the covering power. An optical density of about 3.0 can cover background images adequately.

Using an Apple Macintosh Quadra Model computer and a computer drawing program an image of a face was constructed. Using Aldus Freehand portions of that image were colored so that the eyes were blue, the nose red, and the full face opaque white.

EPS Separation files were constructed from this image and the digital information describing the face communicated to the print head to enable construction of a 4 color plus opaque white hard copy image of said head by means of printing using the 3M Brand Rainbow Dye Sublimation proofer onto a transparent film supply available as 3M Rainbow Transparency Receptor. After printing this image on its transparent base was caused to overlay a reflective 4 color image on a substrate. The face image was seemed to be on top of the background image with no detail of said background showing in the face.

The same image without the white opaque image was again printed on said printer onto a transparent support. When this fully transparent image and substrate was overlaid onto the same a reflective 4 color image on a substrate. The face image was seen top be a part of the background image with details of said background showing in the face.

EXAMPLE 2

A black and white outline image of the face of Donald Duck(Trademark of Walt Disney Co.) was scanned, using a desk top reflection scanner and a data file representing it was sent to an Apple Quadra Computer. A computer application program Freehand available from Aldus resident in the Apple was used to produce and outline image of said face. That outline image was saved as overlay 1.b opaque. The same image file was used to provide an on screen representation that was area colored (face, bill, eye socket, eyes, etc.) with each area colored and saved as an individual file. The files were saved a overlay 2, yellow, overlay 3, magenta, overlay 4, cyan, overlay 5, black. The same file image was used to provide an on screen representation of the image and areas requiring a color opaque effect designated and saved as overlay 7, w.opaque. Using the printer described in FN 46799USA9A U.S. patent application Ser. No. 07/752,770 and containing a dye sublimation donor ribbon consisting of color panels assembled according to the methods disclosed in copending U.S. patent application Ser. No. 08/005,746, filed the same day as this application now U.S. Pat. No. 5,409,883, which is incorporated herein by reference for its disclosure of the methods of manufacturing thermal donor elements and using them in thermal donor processes. In the following order, opaque black, yellow, magenta, cyan, black, and white opaque image data from each of the overlay images files were sent to the printer and a thermal color image of each was produced onto individual sheets of 3M Transparency Rainbow Receptor material. Using said printer a solid color red was made to transfer to a reflective 3M Reflection Rainbow Receptor (polyethylene terephthalate film, with a vapor coated aluminum, and polymeric top coat to receive the mass transfer image.) The respective now printed overlay images were then assembled in register over each other and placed on the red receptor. A full color image of Donald Duck outlined in black was seen on a red color background. No color effect from the background image was seen through the colored portions of the duck.

EXAMPLE 3

The color overlays of Example 2 were placed in register over a back lighted viewing box and photographed onto slide film. When developed a full color image was seen in said slide film.

EXAMPLE 4

A unused transfer layer as described in FN 47792USA2A, U.S. patent application Ser. No. 07/946,871 now U.S. Pat. No. 5,372,987 was applied to the back surface of 3M Transparency Rainbow Receptor material and placed into the printer described in examples 1 and 3. Besides offering a dye receptor layer the transfer layer provided an anti curl layer. The same donor sheets used in examples 1 and 2 were also employed. The data files of example 2 were used in this example.

Overlay file 1 was sent to the printer after directing the printer to make a mirror image of the file and printing this image a black opaque outline image of the duck was seen on the backside of the 3M Transparency Rainbow Receptor.

This now imaged receptor was placed into the printer with the non imaged side of the 3M Transparency Rainbow Receptor facing the thermal print head of same printer and the printer directed to produce a full 4 color plus opaque image output onto the 3M Transparency Rainbow Receptor. After imaging a full four color plus opaque image is seen on one side and a black outline of the images is apparent on the other side. When rephotographed onto slide film a full color representation is seen with a soft black outline image.

EXAMPLE 5

To 400 gm of Nalco 2326 silica dispersion was added 2600 gm of distilled water and 180 ml of a 4 percent solution by weight of surfactant sodium salt of alkylaryl polyether sulfonate (Rohm and Haas Co. Triton X-200). This dispersion was coated onto the backside of sheets of 3M Transparency Rainbow Receptor material and placed dye receptor side up into the printer described in examples 1 and 3. The same donor sheets used in examples 1 and 2 were also employed. The data files of example 2 were used in this example. As in example 2 images were recorded onto individual sheets of 3M Transparency Rainbow Receptor material. Using said printer, a solid color red was made to transfer to a reflective 3M Reflection Rainbow Receptor. The respective now printed overlay images were then assembled in register over each other and placed on the red receptor. A full color image of Donald Duck outlined in black was seen on a red color background. No color effect from the background image was seen through the colored portions of the duck.

When the samples of example 2 and this example were compared it was seen that the inter reflections of light off the various film layers of example 2 were apparent and that the image was not easily seen or recorded without objection as compared to the objects of this example.

EXAMPLE 6

Digital image files containing representations of the Disney character "The Little Mermaid" (are registered Trademarks of the Walt Disney Studios) used in the motion picture of that name consisting of a background, the mermaid body, the mermaid face and the mermaid eyes are used in this example.

Using the 3M Printer previously described, a series of color donor panels of the type described in examples of said U.S. Pat. No. 5,409,883 consisting of a yellow, magenta, cyan, and black layer with an opaque white additional transfer layer are used to produce a background dye sublimation image using the image file designated as background on a 3M Brand Rainbow Transparent Receptor, over this file an opaque white image corresponding to the file called mermaid is transferred onto the above mentioned 4 color image. Over this opaque image the 4 color file called mermaid body is thermally dye sublimated in register with the existing opaque layer. A file called mermaid body is then called up and an second opaque outline corresponding to the mermaid head is applied over the existing background and mermaid body composites image in correct position to the full image of the background and body. A full color image of the mermaid head is applied to the third opaque image by thermal means. A fourth opaque image is applied to the aforementioned single sheet composite in the mermaid head corresponding to the position of eyes within the head. A four color image from the file corresponding to the mermaid eyes is then dye sublimated on top of said fourth opaque image thus producing a composite color image of a mermaid with eyes onto a background. When viewed by transmission this composite single sheet "cel" shows no evidence of the images that appear beneath each of the portions of the image.

EXAMPLE 7

A digital file is made of the Disney character "The Little Mermaid"(registered Trademark) used in the motion picture of that name consisting of a background, the mermaid body, the mermaid face and the mermaid eyes as used in example 6.

Using the program "Freehand" by Aldus, the Background file was previewed on a monitor and the Mermaid file positioned over it in a overlay file mode. A cut out action was performed on the background image corresponding to the position desired for the mermaid body and that modified background file saved. Additionally overlay files were made of the mermaid head and mermaid eyes with the same cut out background action performed and these files saved.

Using the 3M Printer previously described, and a series of color donor panels of the type described in examples of U.S. Pat. No. 5,409,883 consisting of a yellow, magenta, cyan, and black and an opaque white panel are used to produce a four color background dye sublimation image containing cut outs corresponding to other image areas to be applied into said background using the image file designated as background minus cut out on a 3M Brand Rainbow Transparent Receptor.

Over this image exactly over the image cut out area a opaque white image corresponding to the file called mermaid plus new cut out is transferred. Onto the cut out area on the image of the background plus the mermaid body mentioned 4 color image. Over this opaque image the 4 color file called mermaid body plus new cut out area is thermally dye sublimated in register with the existing opaque layer. A file called mermaid eyes is then called up and an second opaque outline corresponding to the Mermaid head is applied over the existing cut out portion of the background. Mermaid body composites image in correct position to the full image of the background and body and corresponding to the opaque area of that image. A opaque image corresponding to the cut out is applied to that area and then a full color image of the mermaid head is applied to this third opaque image. By thermal means a fourth opaque image is applied to the aforementioned single sheet composite in the mermaid head corresponding to the cut out position of eyes within the head. A four color image from the file corresponding to the mermaid eyes is then dye sublimated on top of said fourth opaque image thus producing a composite color image of a mermaid with eyes onto a background. When viewed by transmission this composite single sheet "cel" shows no evidence of the images that appear beneath each of the portions of the image.

EXAMPLE 8

A black and white outline image of the face of Donald Duck (W. Disney) was scanned, using a desk top reflection scanner. Data file representing the duck image was sent to an Apple Quadra™ Computer. A computer application program Freehand™ available from Aldus™ resident in the Apple was used to produce and outline image of each face areas. The face area was then saved and an outline of that face area saved to be used to provide an opaque representation corresponding to that area. For example, the overall duck bill image was saved as "bill image" and its opaque outline save as "bill opq".

Using the printer described in U.S. Ser. No. 07/752,770 which contained a dye sublimation donor ribbon consisting of color panels assembled as per U.S. Pat. No. 5,409,883 with color panels arranged in the order of black, opaque, yellow, white opaque, magenta, white opaque, cyan, white opaque and black, white opaque. The hard copy receptor material used in this example was 3M Brand Rainbow™ receptor. Also utilized were the method and process for adjusting colorants in a reproduction FN (Rylander and Ver Merlen and Fisch and Larshus). Such means were employed to provide color matching of the donor colors to that of the final color used in the photographic process for producing animation images.

The image files were sent to the printer in the following order. the first image printed on the receptor was that of the opaque area corresponding to the face itself. Without removing the receptor in register with the previous image, that of the color of the face was thermally imaged onto the receptor. Without removal of the receptor from the proofer in register with the previous image removing the receptor from the printer. The opaque area corresponding to the duck bill was printed over the already existing image of face plus opaque image of the face image using the opaque panel of the donor ribbon. Without removing the receptor from the printer the next image transferred from the file, that of the color of the bill was thermally imaged onto the receptor without removal of the receptor from the proofer in register with the previous image. the same actions were repeated until opaque areas and color images were sequentially produced onto the reflection stock to enable a full reproduction of the duck. When imaging was complete a full color hard copy reproduction of the duck was apparent. At not point where an opaque area was used in conjunction with an image area of the same shape and size was the background color of the image area observed.

The reflective image thus produced did not match that of the same image on the Apple color monitor. this is to be expected since the monitor and reflective copy to don't use the same color mixing technique, e.g, the monitor uses additive printing, the hard copy subtractive printing. The monitor provides no useful prediction of the image when subsequently printed for production measuring using subtractive techniques. This phenomenon is recognized and has been repeatedly reported. Such recent reports include, Color Gamut Mapping and the Printing Process by Stone, Cowwan and Beatty in ACM (Association for Computing Machinery) "transactions on graphics" 10/88 Vol. 7,No. 3, pages 249 to 293 and TAGA (Technical Association of the Graphic Arts) 1992 Proceedings Vol 2, "Comparisons of Color Images Presented in Different Media, That are Intended to Simulate Each Other or Another Image, especially "Techniques for Reproducing Images in Different Media: Advantages and Disadvantages of Current Methods by T. Johnson TAGA Proceedings 1992 Vol. 2 pages 739 to 755.

Using the computer stored image and opaque form files of this same image and the identical printer and donor ribbon this time however transparent receptors were employed instead of reflective receptor. The transparent receptor used was 3M Brand Rainbow Transparency Receptor.

The computer stored files of each of the images and their corresponding opaque areas were sent to the printer however instead of all of the file images being reproduced over one another to provide a single sheet final image each image set was produced on to a separate transparent receptor, e.g., the opaque portion of the duck face and its corresponding in register full color image was reproduced on a different transparent support until a series of separate transparency images corresponding to the final image (a animation "cel") was produced.

Using a lighted viewing box color corrected for the intermediate color negative photographic color negative imaging film imaging film used in animation production the overlay material were imaged onto Eastman Kodak (EKC) Kodak Color Negative Film a product of Eastman Kodak, Rochester N.Y. U.S.A. as described in their information booklet H-1-5245 which in turn was contact imaged onto (EKC) Kodak Color Positive Release Film a product of Eastman Kodak, Rochester N.Y. U.S.A.

The final color reproduction on EKC Color Positive Release Stock is a function of the colors in the "cel" the color spectral sensitivity of the EKC Color Negative Film, the masked color images produced the Color Negative stock the spectral sensitivities of the EKC Color Positive Release film and the color of the images of the Positive release film. The sum of these interactions a produce color reproduction changes even greater than those reported in the preceding references, thus minimizing the prediction of the animation color on the motion picture screen by viewing the same images on a color monitor or by the "cels" themselves.

The color hard copy provided a close match in color to that of the final image on color positive release film than that of the monitor. Thus providing a proof which predicts the color of the final image.

What we claim is:

1. A process for the formation of a cel for use in color animation motion picture production comprising the steps of providing electronic information of a color image to a thermal printer, thermally printing a first image having at least some opaque areas therein onto a transparent carrier sheet from said electronic information, and optically combining said first image with a second image on a separate transparent sheet, the composite of the first and second image forming a cel.

2. The process of claim 1 wherein prior to combining said first image with a second image, said second image is formed by thermal transfer imaging onto said separate transparent sheet from electronic information representing the second image.

3. The process of claim 2 wherein said thermal transfer imaging comprises thermal mass transfer of a dye and/or pigment in a binder resin.

4. The process of claim 2 wherein said second image is formed by thermal mass transfer of a dye and/or pigment in a binder resin.

5. The process of claim 4 wherein said first and second image each have more than one color, and a black border is between said colors in at least one of said first and second images, and said black border is deposited by a thermal transfer process.

6. The process of claim 1 wherein said first and second image each comprise more than one color, and there is a border between said colors in at least one of said first and second images which is deposited by a thermal transfer process.

7. The process of claim 1 wherein said first image is an overlay image and said second image is a background image for a cel.

8. The process of claim 1 wherein said opaque areas is has a color or tone selected from the group consisting of white, bone, ivory, gray, black, or metallic.

9. The process of claim 8 wherein said opaque areas have a transmission optical density of more than 0.05.

10. The process of claim 9 wherein after the cel has been formed, the step of taking a color photographic image of said cel is performed.

11. The process of claim 1 wherein said opaque areas has a color or tone selected from the group consisting of red, magenta, yellow, cyan, blue or green.

12. The process of claim 11 wherein said opaque areas have a transmission optical density of more than 0.05.

13. The process of claim 12 wherein at least one thermal transfer image is formed on each side of said transparent carrier.

14. The process of claim 1 wherein after the cel has been formed, the step of taking a color photographic image of said cel is performed.

15. The process of claim 1 wherein in the formation of a cel for color animation motion picture production, at least one color image is formed by thermal dye transfer onto an opaque area within said opaque areas.

16. The process of claim 15 wherein said opaque areas is formed by the thermal mass transfer of material in an imagewise fashion onto said transparent carrier sheet.

17. A process for the formation of a cel for use in color animation motion picture production comprising the steps of providing electronic information of a color image to a thermal printer, thermally printing a first image having at least some opaque areas thereon onto one surface of a transparent carrier sheet from said electronic information, and then optically combining said first image with a second image on a second surface of said transparent carrier sheet, the composite of the first and second images forming a cel.

* * * * *